United States Patent [19]
Zellweger

[11] Patent Number: 6,131,100
[45] Date of Patent: Oct. 10, 2000

[54] METHOD AND APPARATUS FOR A MENU SYSTEM FOR GENERATING MENU DATA FROM EXTERNAL SOURCES

[76] Inventor: Paul Zellweger, 12 Holworthy Pl., Cambridge, Mass. 02138

[21] Appl. No.: 09/033,775

[22] Filed: Mar. 3, 1998

Related U.S. Application Data

[60] Provisional application No. 60/039,877, Mar. 4, 1997.

[51] Int. Cl.[7] .................................................. G06F 17/30
[52] U.S. Cl. ......................................... 707/104; 707/103
[58] Field of Search .................................. 707/101, 104, 707/100, 103; 395/162

[56] References Cited

U.S. PATENT DOCUMENTS

| | | | |
|---|---|---|---|
| 4,807,142 | 2/1989 | Agrawal | 709/100 |
| 5,325,484 | 6/1994 | Motoyama | 395/162 |
| 5,471,613 | 11/1995 | Banning et al. | 395/600 |
| 5,630,125 | 5/1997 | Zellweger | 395/600 |
| 5,701,453 | 12/1997 | Maloney et al. | 395/602 |
| 5,787,432 | 7/1998 | LeTourneau | 707/101 |

*Primary Examiner*—Wayne Amsbury
*Assistant Examiner*—Frantz Coby

[57] ABSTRACT

The present invention discloses a menu system that produces code consistent with software routines that generate menu data for an open hierarchical data structure. The structure provides the basis for a content menu. Both the menu and the structure are distinctive because they enable multiple paths to flow to the same information object at the end of a menu path. The primary challenge to generating menu data for this type of menu system involves coordinating sources of data. The present invention discloses a graphical user interface means for menu developers to access sources of data, and generate the predefined code consistent with the software means to generate menu data.

24 Claims, 9 Drawing Sheets

| BID | Author | Title | Language | Subject | PID |
|---|---|---|---|---|---|
| A | West, T.W. | Architecture In Scotland | English | Scotland | 617 |
| B | Turner, W.J. | British Craftsmanship | English | England | 864 |
| C | Liscombe, C.W. | Francis Rattenbury and BC | English | Canada | 10 |
| D | Meyer, Peter | Schweizer Wohnhauser | German | Switzerland | 40 |

Fig. 2a

| PID | Pub_Name | Pub_City | Pub_Country |
|---|---|---|---|
| 617 | McKay | New York | United States |
| 864 | Collins | London | England |
| 10 | University of British Columbia | Vancouver | Canada |
| 40 | Grisberger | Zurich | Switzerland |

Fig. 2b

Publisher, Pub_Name, (PID, (Books, Language, (PID, (Books, Title, (PID, BID)))))

METHOD AND APPARATUS FOR A MENU SYSTEM FOR GENERATING MENU DATA FROM EXTERNAL SOURCES

CROSS REFERENCES TO RELATED APPLICATION

This application is based on Provision al Application No. 60/039,877 entitled "Method and Apparatus Menu Access for a Relational Database Management System", filed Mar. 4, 1997.

FIELD OF INVENTION

The present invention relates, in general, to a graphical user interface that generates a coded expression, and in specific, it refers to a menu system that relates external sources of menu data that can be applied to software that generates data for menu systems.

REFERENCES

U.S. Patent Documents
U.S. Pat. No. 5,787,432 Jul. 28, 1998 LeTourneau 707/101
U.S. Pat. No. 5,630,125 May. 13, 1997 Zellweger 395/600
U.S. Pat. No. 09/033,764 Mar. 3, 1998 Zellweger 395/600
U.S. Pat. No. 5,701,453 Dec. 23, 1997 Maloney et al. 395/602
U.S. Pat. No. 5,471,613 Nov. 28, 1995 Banning et al. 395/600
U.S. Pat. No. 5,325,484 Jun. 28, 1994 Motoyama 395/162
U.S. Pat. No. 4,807,142 Feb. 21,1989 Agrawal 709/100

Other References

Date, C. J. An Introduction to Database Systems. vol. 1, Reading, Mass.: Addison-Wesley, 1986.
Wood, Derrick. Data Structures, Algorithms, and Performance. Reading, Mass.: Addison-Welsey, 1993.
Zellweger, Paul. "Web-based Sales: Defining the Cognitive Buyer." International Journal of Electronic Markets. Vol. 7-No. 3, pp. 16–22.
Zellweger, Paul. The Knowledge Tree. unpublished paper. copyright ArborWay Electronic Publishing, Inc. 1998. Jan. 3, 1998.

BACKGROUND OF THE INVENTION

A content menu works like a book index (Zellweger, 9/1997) using a list of lists to organize content details in an information system. Unlike prior menu systems that employ mutually exclusive pathways, the content menu allows multiple paths to reach the same information object. This feature is distinctive to the content menu and its underlying menu structure, the open hierarchical data structure (Zellweger, May. 13, 1997 U.S. Pat. No. 5,630,125), and enables it to support unlimited cross referencing capabilities. As a retrieval technology, the content menu is an extremely appealing alternative to other methodologies, such as searches and database queries, because it enables end-users to see content details and pinpoint information they need.

However, building networks of paths in an open hierarchical data structure is tedious and very time consuming. Zellweger (09/033,764) discloses the software means to generate menu data from external sources but the technology is languagebased and not particularly easy to master. In addition, in an information rich setting, like a database management system, managing the environmental details of the disclosed command language is cumbersome. The present invention discloses a graphical user interface that enables a developer to coordinate various data sources and to generate commands that are consistent with the software routines that generate menu data.

Prior interface means, such as Maloney et al. (U.S. Pat. No. 5,701,453), coordinate various data sources in a database to establish a schema that provides end-user access to database content. Banning (U.S. Pat. No. 5,471,613) also discloses an interface means to generate SQL commands to a database to retrieve specific content. However, both of these interface means are tied directly to the logical links of the underlying database structure, and neither is intended to support data sources outside the database.

OBJECT AND ADVANTAGES

It is a general object of the present invention to provide a method and apparatus for a graphical user interface that can generate commands consistent with the software means that generate menu data for an open hierarchical data structure.

One object of the present invention is to provide a seamless, visually-based access method to external sources of menu data on a computer network.

Another object of the present invention is to provide a means to coordinate external sources of data located on both a host and remote computer memory storage device.

One object of the present invention is to facilitate an easy way to establish relationships between one external data source and another which can produce code that is consistent with software that generates menu data for a content menu.

SUMMARY OF THE INVENTION

The objects of the invention are attained by providing graphical user interface methods and apparatus. These enable a menu developer to navigate through a succession of external sources of menu data, and produce code that can be applied to software routines that generate menu data and paths in an open hierarchical data structure.

BRIEF DESCRIPTION OF THE FIGURES

FIGS. 2a and 2b depicts a graphical representation of external database structures that contain sample input data.

DETAILED DESCRIPTION OF THE FIGURES

Figure 1:
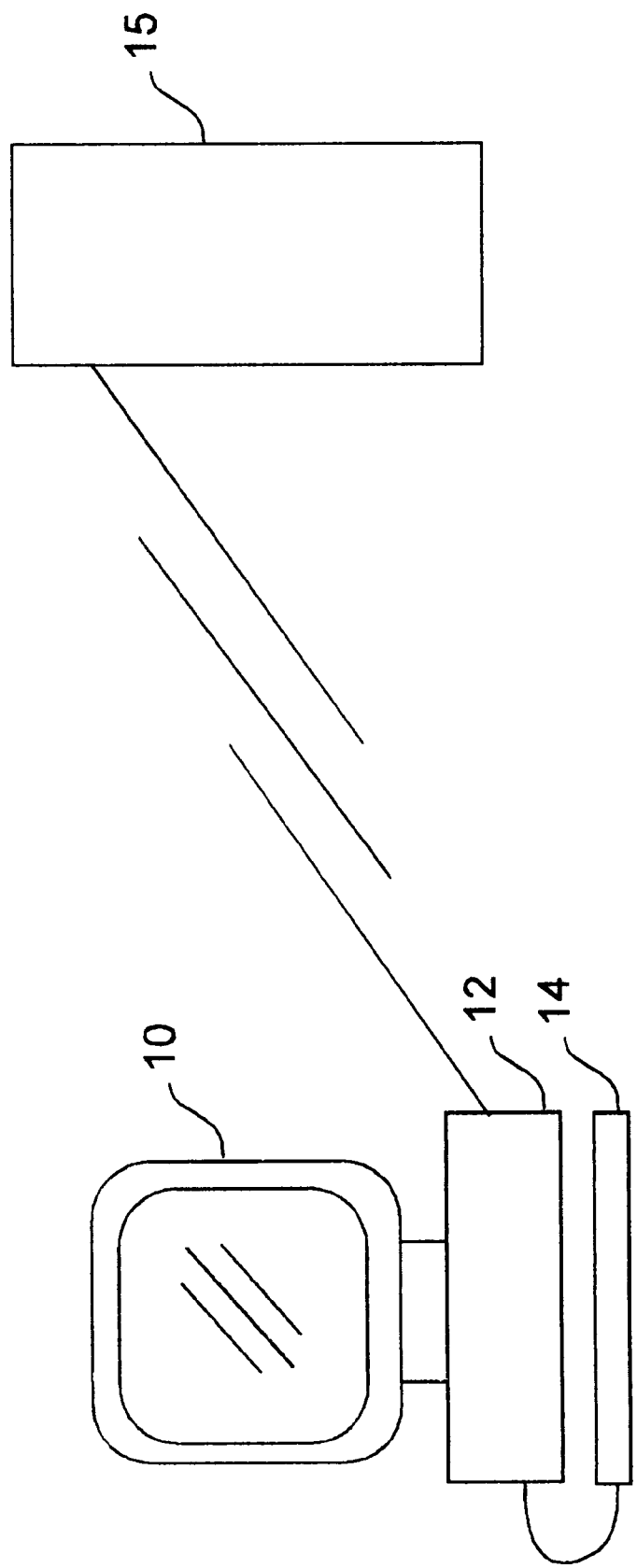
FIG. 1 depicts the computer apparatus of the present invention.

The apparatus of the present invention, a computer monitor 10, keyboard input device 14, local computer 12, and remote computer 15, is displayed in FIG. 1. The computer monitor 10 displays the graphical user interface of the present invention. Input devices like the keyboard device 14 are connected to a local computer 12. Alternative input devices include voice recognition means. as well as other perceptual-motor and sensory-perceptual input means.

The local computer 12 is electronically linked to one or more computers like remote computer 15, through network communications. Menu data from external sources of data include files on both the local computer 12 and remote computer 15.

To demonstrate the software means of the present invention, tables in a relational database management system will be used to characterize an embodiment of data management architecture. However, the present invention is not limited to a relational database architecture, and alternative database architectures, such as an object-oriented database management system, can provide an alternative data management embodiment of the present invention.

FIGS. 2a–2b depict an external source of menu data, data on a set of books generated and maintained by a database application. FIG. 2a depicts the columns and rows in the Books database structure 16. Each row in structure 16 represents a book in the demonstration set. Columns in structure 16 represent properties of each book such as its author, title, subject matter, and so on. Information on book publishers is stored in a separate lookup structure 18 depicted by FIG. 2b in order to avoid problems with updates, and thereby satisfy database requirements for normalization. The Publishers structure 18 in FIG. 2b is linked to the Books structure 16 in FIG. 2a by the PID column 17.

Figure 3:
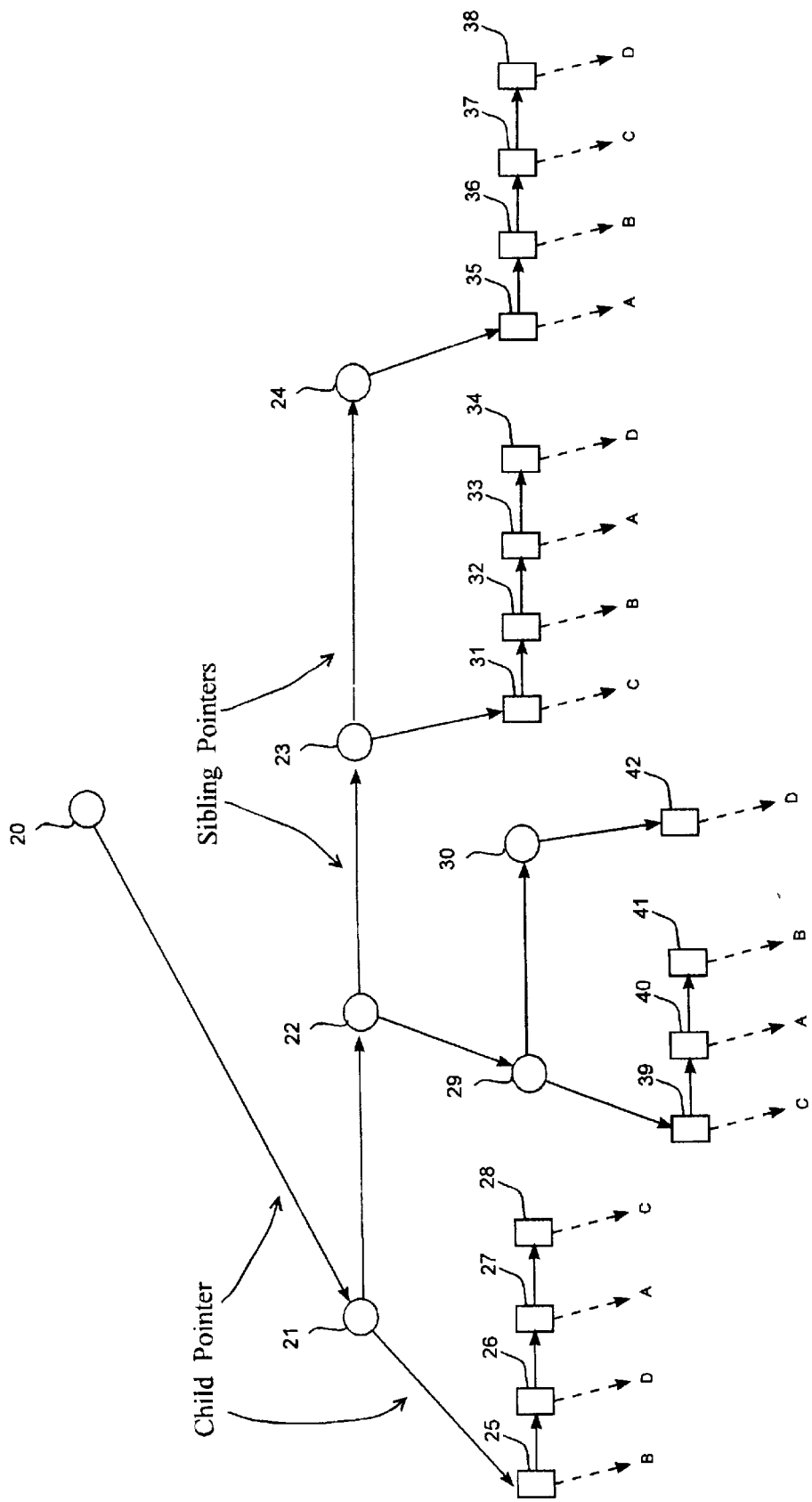
FIG. 3 is a graphical representation of the prior art, an open hierarchical data structure.

An open hierarchical data structure, depicted in FIG. 3, stores menu data for the content menu. Flow starts at root node 20 and progresses to a leaf node at the end of a path that links to an information object such as A, B, C, D, or E. As mentioned before, the distinctive feature about this prior structure, and the prior art of the content menu it produces, is that one or more paths lead to the same information object.

Figure 4:
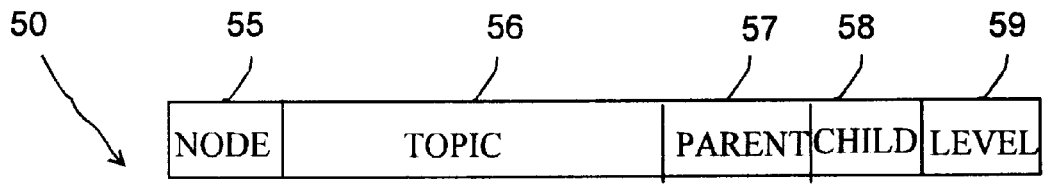
FIG. 4 is a graphical representation of a database structure of the prior art that represents nodes in the open hierarchical data structure.

Nodes in an open hierarchical data structure can be represented by rows in a database structure 50. FIG. 4 depicts such a table structure. Columns in structure 50 organize menu data for the content menu. This includes structural information like a node's parent link in column 57, child link in column 58, and level in the structure in column 59. It also includes a unique identification number in column 55 and content information in column 56 that provides menu data for an entry in a list menu.

In the preferred embodiment of the prior art, a relational database management system stores information about each node. Alternative embodiments of the prior art store node information in a predetermined file format. For example, alternative embodiments of the prior art store node information in object models in an object-oriented database management system.

FIGS. 5a–5e depict the menu windows of the graphical user interface (GUI) means of the present invention. The menu developer navigates through these menus to produce code. This code is consistent with the software means to generate nodes in the open hierarchical data structure that produce new menu paths in a content menu. The code provides a symbolic representation of the relationship between one or more sets of data, and the menu paths produced by the nodes added to the open hierarchical data structure. The preferred embodiment of this coded expression is, link node, list name, list objects where link node—a reference to an existing node the structure.
        list name—a name that will serve as a new menu entry for a new menu path list objects—a reference to one or more sets of external data.

One or more embedded list objects enables the prior software art to generate menu data, and more specifically, a series of connected nodes in an open hierarchical data structure that corresponds to a menu path or set of nested list menus. The preferred embodiment of the list objects expression is, list object=display source, display expression, (source link, object link or list object)

where display source—a file or database structure that contains relevant menu data display expression—a reference to a file location or database structure element. The display expression also includes any built-in functions supported by a file management or database system and any conditional statements supported by such systems.

source link—a column or field reference in the file or database structure that contains link values associated with a menu data element.

object link—a column or field reference in the file or database structure that associates a menu data element with elements associated with an information object.

Figure 5A:
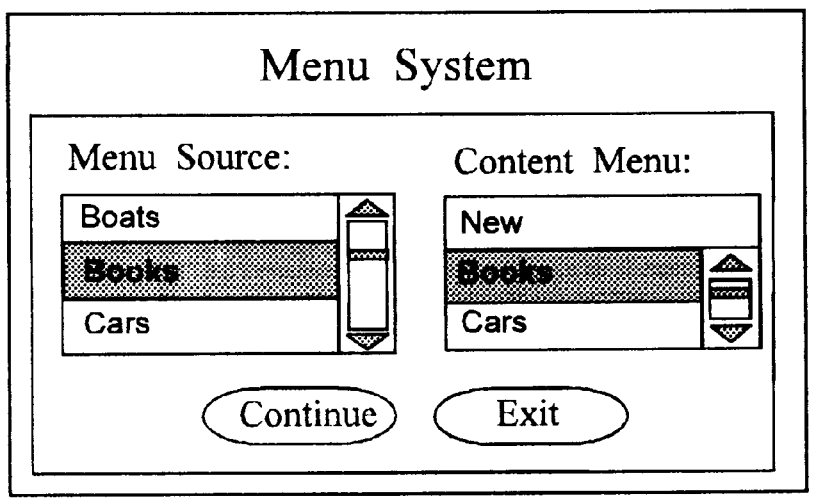
FIGS. 5a. through 5f is a graphical representation of the user interface of the method and apparatus of the present invention.

FIG. 5a represents the first menu window a menu developer encounters in an embodiment of the menus in the present invention. Here a menu developer connects to a database or file that stores a representation of an open hierarchical data structure from a scrolling list of available databases and files under the "Menu Source" label. Next, the developer selects an existing content menu or creates a new one.

Figure 5B:
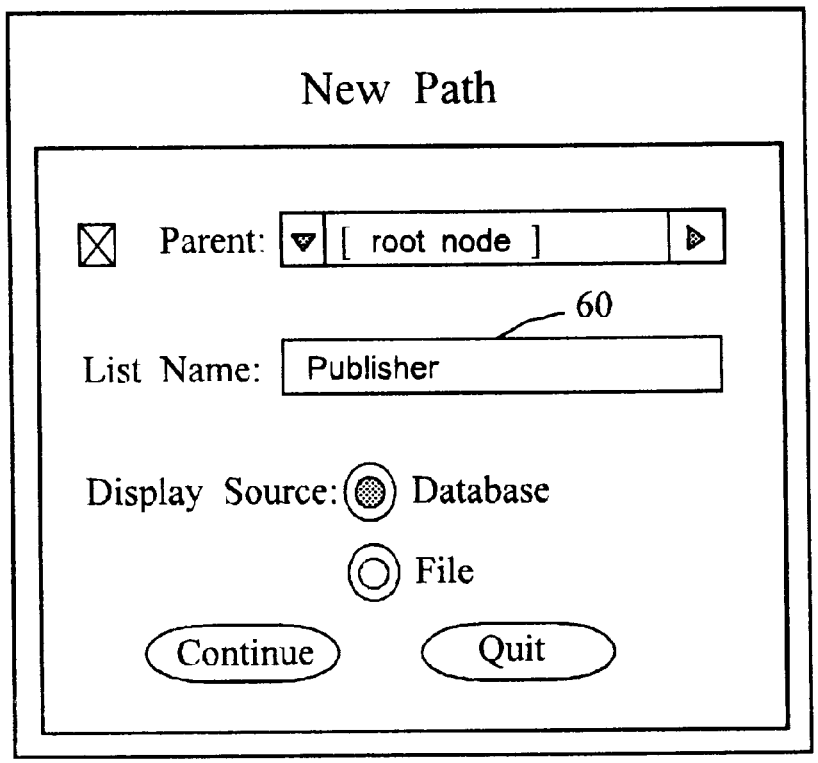

Once the content menu is selected, the present invention displays the New Path menu depicted in FIG. 5b. A new path can be attached to any node in a content menu structure. To reach a node the end-user developer navigates through the structure to select a specific node entry. The end-user developer can supply a list name to the text field 60 to create a menu entry for the new list. Next, the developer selects a structure or a file button to designate the display source for the new menu path.

Figure 5C:
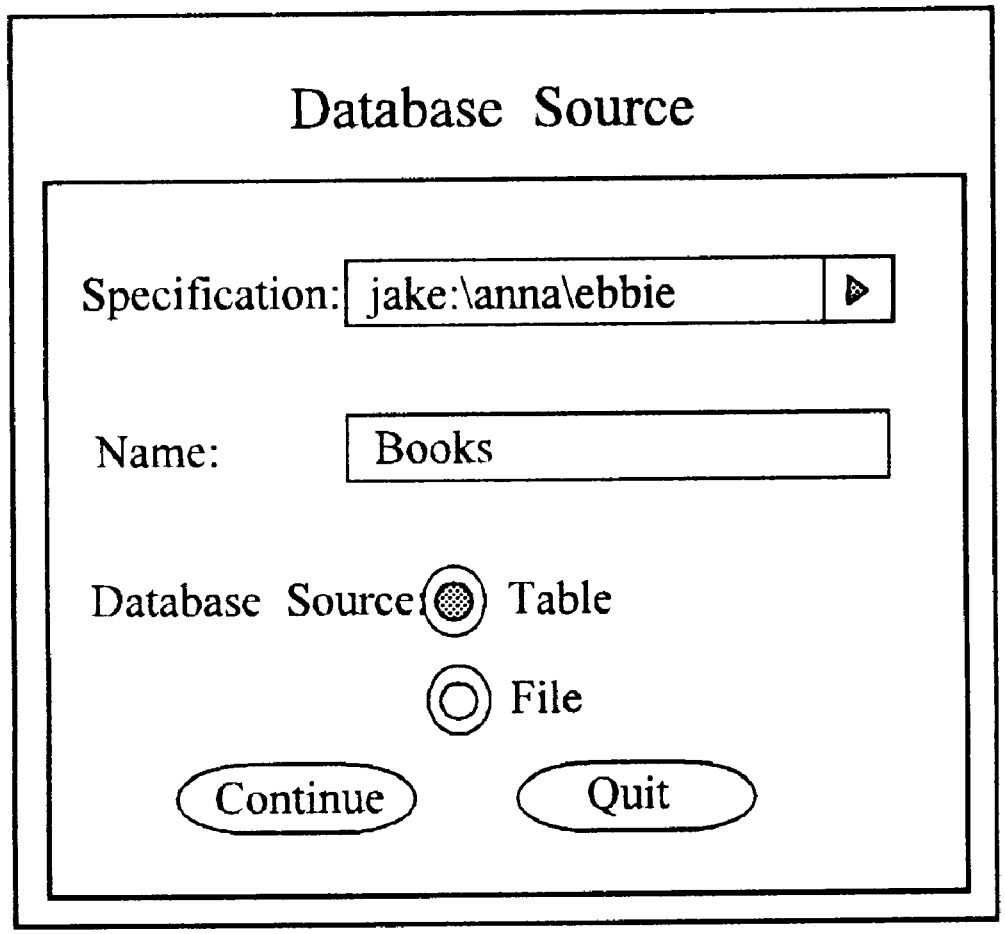

FIG. 5c depicts the Database Source menu. This menu is activated when a Database button is selected. The Database Source menu includes a database specification input field that enables a menu developer to connect to a database on a remote computer 15 electronically linked to a local computer 12. Once the menu developer has connected to a database management system, the scrolling window displays the names of available databases. When a database is selected from this window it becomes the default system for all future references.

Figures 5D, 5E:
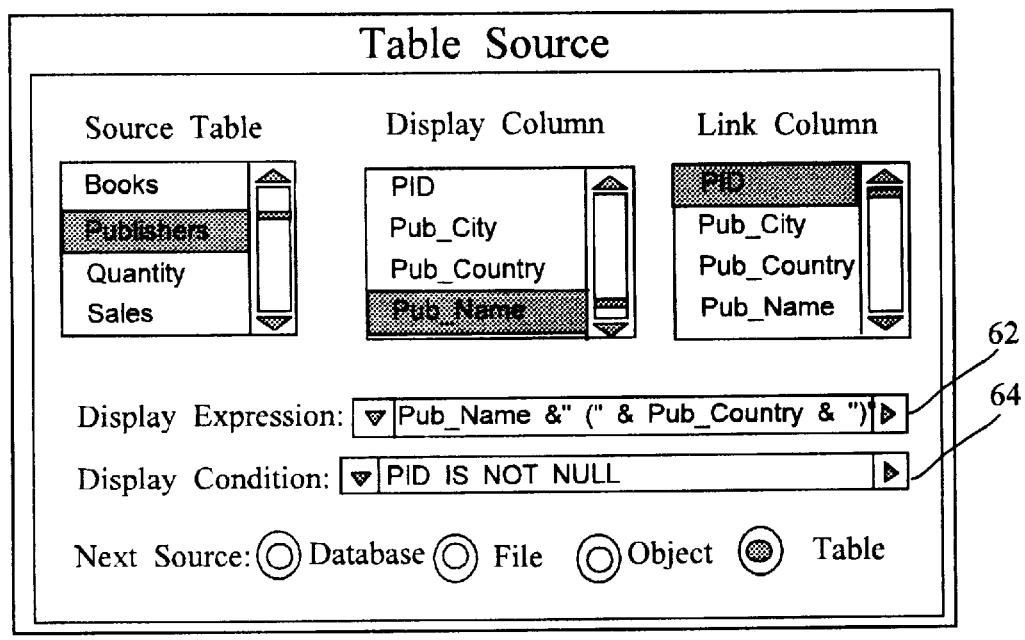

FIG. 5d depicts the Table Source menu. This menu is activated when a table source button is selected from one of the previous menus. The Table Source menu includes a scrolling list of tables associated with the selected content database. When a table is selected by the developer the table's columns are displayed in the scrolling lists underneath the Display Column and Link Column labels. The developer selects a display column to identify the data values for a list menu. Next, the developer selects a link column to link the current list menu to an information object or another list menu.

The Display Expression field 62 in the Table Source menu enables a developer to format the display values by supplying a text expression that includes text functions and references supported by the underlying database. For example, the Display Expression field 62 in FIG. 5*c* would produce entries in a list menu that would include a publisher's name along with the publisher's country in parenthesis.

The Display Condition field 64 in FIG. 5*c* enables a developer to set conditions on the selection of display records using a condition clause like a WHERE clause in an SQL statement supported by the underlying database.

And finally, a developer uses the set of radio buttons associated with the Next Source label to link the current list menu produce by the current menu settings, to another data source and list menu, or to an information object.

If the end-user developer selects the File option in response to the Next Source, prompt the File Source menu depicted in FIG. 5*e* is presented. The developer uses this menu to fetch data from an external file and specify how it is formatted. Fixed-length fields start and end in the same column for each line or record in the file. Variable-length fields have different start and end positions but they occur in the same sequence from one line to the next.

When the developer provides a file name the first line of the file is displayed underneath the Display Field and Link Field labels. He or she then can use the arrows in the display window to move to the next line or scroll through the line columns. The developer uses a cursor to highlight and designate the Display and Link Fields in these windows.

Alternative embodiments of the File Menu in the present invention enable menu developers to select from a variety of commercially available file formats. When such a format is selected the menu displays the means to locate relevant menu data fields.

Figure 5F:
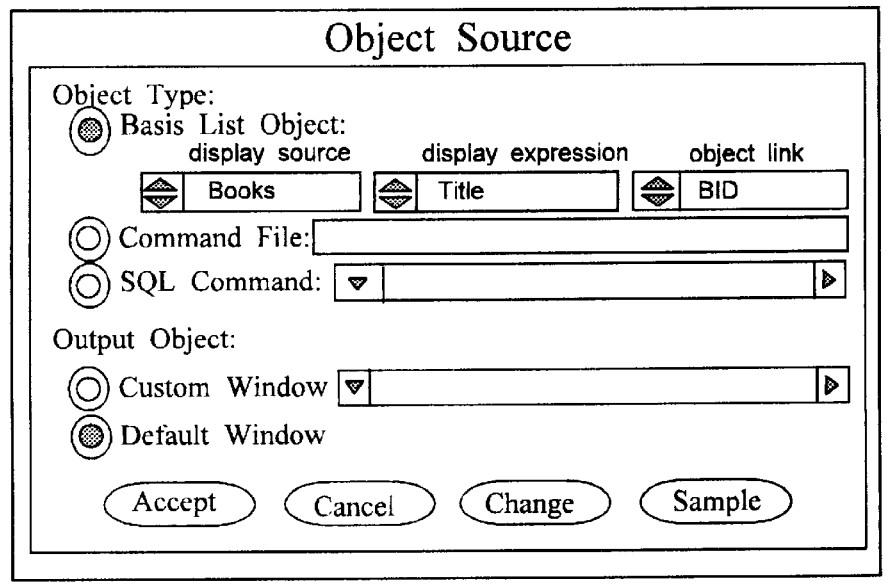

The Object Source menu is depicted in FIG. 5*f*. This menu provides the means for the developer to define how an information object is generated and displayed. Three options exist in generating an information object. A Basis List Object option refers to a database structure that contains link values used to locate an information object. In FIG. 5*f* the database table Books refers to such a structure. The database column Title refers to a display expression for the menu entry and the BID column refers to the object link value. Command File option allows a developer to supply a file name and path that can be executed at run time to create and display an information object. And finally, the SQL, Command option enables a developer to store an SQL command or similar query command that provides the means for selecting information that can generate an information object at run time.

A developer can also designate Custom or Default windows to display an information object. A default output window is derived from columns in the basis table or a screen response of an SQL command. The custom window field enables a menu developer to provide a file name that contains information on how the information object should be displayed.

Figure 6:
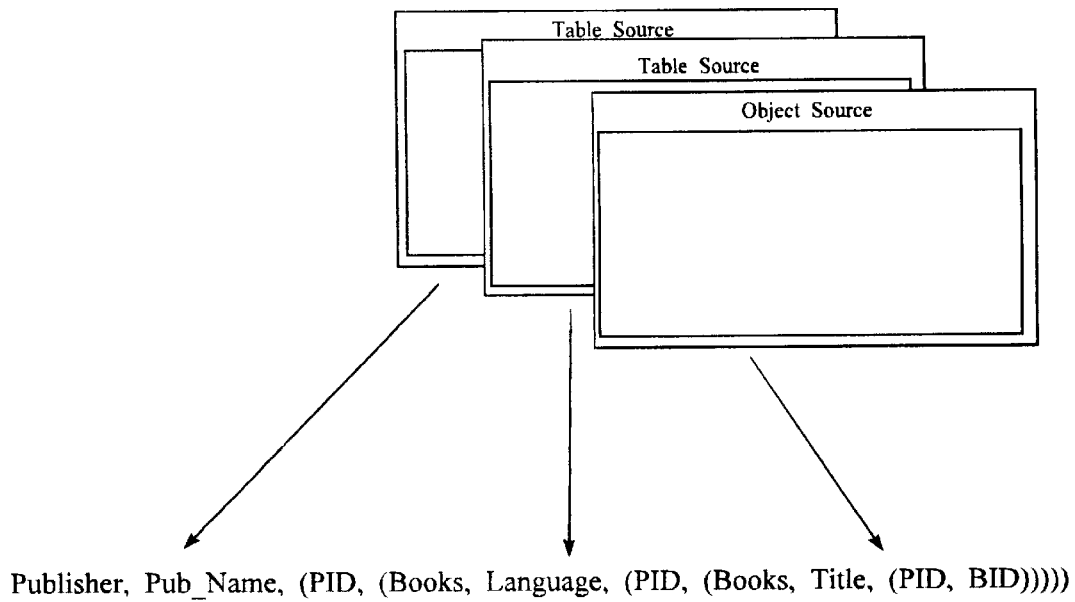
FIG. 6. is a graphic representation of the relationship between a set of menus in the present invention and the code produced by the present invention.

FIG. 6 provides a pictorial representation of the relationship between each successive source menu and the code produced by the present invention. The code generated by the present invention conforms to a predefined syntax and format that was previously disclosed as a means to represent input to a means for generating menu data for a series of nested list menus. Alternative embodiments of the of present invention can generate alternative code expressions as input to generate menu data.

The code means of the preferred embodiment of the present invention includes information from the New Path menu depicted in FIG. 5*b*. This includes the means to connect a new path to parent node in an existing data structure and the means to create a new list menu entry that links directly to the new path. Most importantly, the code also includes the means to represent the relationship between a display source and a set of list objects that connect to an information object.

Figure 7:
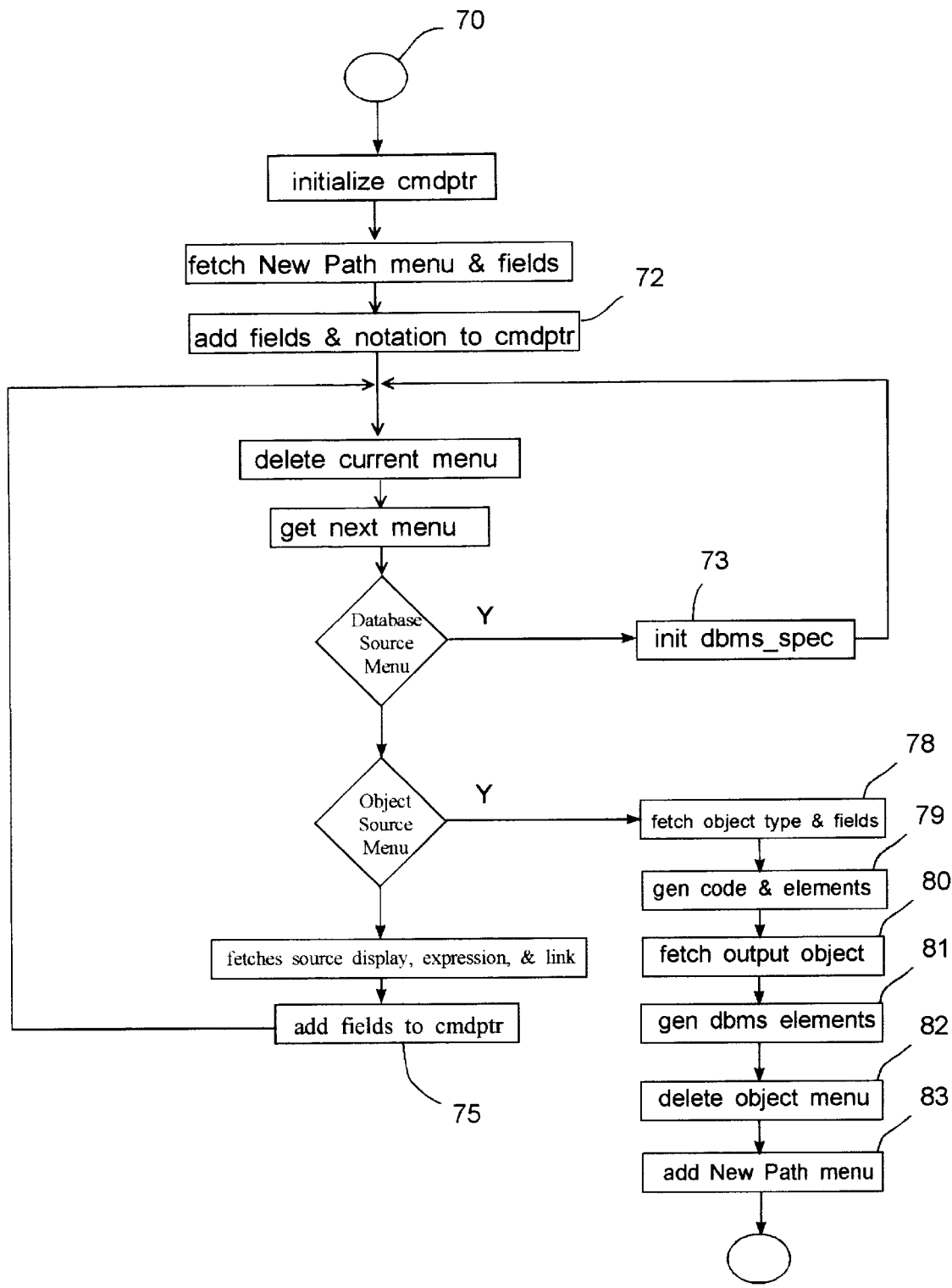
FIG. 7 is a flow chart of the software means of the present invention.

In the preferred embodiment of the present invention, the software means employ an event-driven architecture. FIG. 7 depicts the flow chart of the software means used to generate the code depicted underneath the succession of menus in FIG. 6. When the end-user selects the "Accept" button in the Object Source menu, depicted in FIG. 5*f*, program control flows to routine 70.

Routine 70 first initializes a pointer to a command string, cmdptr Next, routine 70 retrieves the New Path menu and the fields that contain the link node and list name values. Routine 70 uses these field values to build the command string at 72. Next, the routine loops through all the menus navigated by the developer to get to the Object Source menu.

Each time the routine encounters a Database menu it retrieves the new dbms specification and initializes the dbms_specification at 73. For each table or file source menu encountered, the loop fetches source display, display expression, and source link values from the menu at 74. Next, it concatenates these values to produce code consistent with the predefined code expression at 75, and loops back for next active source menu.

When the Object Source menu is encountered the routine fetches the selected object type option at 78 and generates the appropriate database elements and code that references these elements at 79. Next it fetches the selected output object at 80 and generates the appropriate database elements and linkage to the output object at 81. Finally, the program flow deselects and deletes the Object Source menu at 82 and creates a new, New Path menu, at 83 and passes control to it.

Glossary basis list object—a list object that contains a link used to produce an information object.

content menu—an end-user menu produced by an open hierarchical data structure. The structure allows an unlimited number of cross reference and detail and serves as a knowledgebase that describes content in an information system.

display column—a column or database element that contains text or graphic images that provide the basis for a set of unique entries in a list menu.

display expression—the second element of a list object expression that is derived from a database structure element and includes text functions and references supported by the host database or file management system. This includes ways to select database elements by setting a condition, like a WHERE clause in the SQL.

display source—a specification for database structure or external file that stores elements that refer to menu entries in a list menu.

information object—one or more media elements, like text or graphic image, that form an information object.

list object—predefined code that provides the means to represent the set of relations between an information object and their associated attribute values stored in a database structure or file. The code is used as input to a means for generating menu data for a content menu.

object link—a database element that contains values used to link media elements that make up the information object.

open hierarchical data structure—a hierarchical data structure composed of nodes that have two pointers, a sibling pointer and a child pointer, and two types of nodes, branching and data nodes. The child pointer in a branching node points to another branching node. The child pointer in a data node points to an information object. A distinctive characteristic of the structure is that it enables multiple paths from the root to an information object linked to a leaf at the bottom of the structure.

reference list object—a list object that includes an embedded list object.

Conclusion

This concludes the description of an embodiment of the invention. The foregoing description of the embodiment of the invention has been presented for the purpose of illustration and description. It is not intended to be exhaustive or limit the invention to the precise form disclosed. Many modifications and variations are possible in light of the above teaching. It is intended that the scope of the invention be limited not by this detailed description, but rather by die claims appended hereto.

Having described an embodiment of the invention we claim:

1. A graphical user interface system on a computer processor consisting of,
    displaying a source graphical user interface that enables an end-user to identify a file object that contains external menu data,
    fetching information about said file object from said source graphical user interface,
    opening said file object that contains external menu data,
    displaying a set of selections in a content graphical user interface that represent external menu data drawn from said file object,
    displaying a set of next source controls that enables said end-user to establish a link between said set of selections in said content graphic user interface and a second set of selections in a second content graphical user interface,
    fetching a selection made by said end-user in said set of next source controls,
    fetching said set of selections chosen by said end-user in said content graphical user interface that represents a set of external menu data,
    executing software associated with said set of next source controls that displays said second content graphical user interface based on said selection made by said end-user,
    displaying said second content graphical user interface representing an opportunity to identify another said set of external menu data,
    displaying a control responsible for generating a symbolic expression that represents said link between sources of external menu data selected by said end-user in said content user interface and sources of external menu data in said second content graphic user interface,
    executing software associated with said control responsible for generating said symbolic expression that includes said link,
    generating said symbolic expression that represents at least two different said set of external menu data and shows how each said set of external menu data relates to another.

2. The graphical user interface system of claim 1 wherein said graphical user interface system is implemented in a computer program language that is compatible with at least one operating system on said computer processor.

3. The graphical user interface system of claim 1 wherein displaying said content graphical user interface is compatible with at least one operating system on said computer processor.

4. The graphical user interface system of claim 1 wherein displaying said content graphical user interface further includes displaying record-oriented content in said file object.

5. The graphical user interface system of claim 1 wherein opening said file object further includes said file object that has a predetermined file format compatible with at least one operating system.

6. The graphical user interface system of claim 1 wherein opening said file object further includes said file object that has a predetermined file format compatible with at least one database management system.

7. The graphical user interface system of claim 1 wherein displaying said content graphical user interface further includes displaying content from a database structure in said file object.

8. The graphical user interface system of claim 1 wherein displaying said content graphical user interface further includes displaying a selection that identifies menu topic data in said file object.

9. The graphical user interface system of claim 1 wherein displaying said content graphical user interface further includes displaying a selection that identifies topic link data in said file object.

10. The graphical user interface system of claim 1 wherein displaying said content graphical user interface further includes displaying a graphical user interface that enables said end-user to format menu topic data.

11. The graphical user interface system of claim 1 wherein displaying said content graphical user interface further includes displaying a graphic user interface that enables said end-user to set a condition on the selection of external menu data in said object file.

12. The graphical user interface system of claim 1 wherein displaying said set of selections in said content graphical user interface further includes displaying a selection of menu topic data and topic link data from two different file objects.

13. A graphical user interface system on a computer processor consisting of,
    a means for displaying a source graphical user interface that enables an end-user to identify a file object that contains external menu data,
    a means for fetching information about said file object from said source graphical user interface,
    a means for opening said file object that contains external menu data,
    a means for displaying a set of selections in a content graphical user interface that represent external menu data drawn from said file object,
    a means for displaying a set of next source controls that enables said end-user to establish a link between said set of selections in said content graphic user interface and a second set of selections in a second content graphical user interface,
    a means for fetching a selection made by said end-user in said set of next source controls,
    a means for fetching said set of selections chosen by said end-user in said content graphical user interface that represents a set of external menu data,
    a means for executing software associated with said set of next source controls that displays said second content graphical user interface based on said selection made by said end-user,
    a means for displaying said second content graphical user interface representing an opportunity to identify another said set of external menu data, a means for displaying a control responsible for generating a symbolic expression that represents said link between sources of external menu data selected by said end-user in said content user interface and sources of external menu data in said second content graphic user interface, a means for executing software associated with said control responsible for generating said symbolic expression that includes said link, a means for generating said symbolic expression that represents at least two different said set of external menu data and shows how each said set of external menu data relates to another.

14. The graphical user interface system of claim 13 wherein said graphical user interface system is implemented in a computer program language that is compatible with at least one operating system on said computer processor.

15. The graphical user interface system of claim 13 wherein said means for displaying said content graphical user interface is compatible with at least one operating system on said computer processor.

16. The graphical user interface system of claim 13 wherein said means for displaying said content graphical user interface further includes a means for displaying record-oriented content in said file object.

17. The graphical user interface system of claim 13 wherein said means for opening said file object further includes said file object that has a predetermined file format compatible with at least one operating system.

18. The graphical user interface system of claim 13 wherein said means for opening said file object further includes said file object that has a predetermined file format compatible with at least one database management system.

19. The graphical user interface system of claim 13 wherein said means for displaying said content graphical user interface further includes a means for displaying content from a database structure in said file object.

20. The graphical user interface system of claim 13 wherein said means for displaying a set of selections in a content graphical user interface further includes a means for displaying a selection that identifies menu topic data in said file object.

21. The graphical user interface system of claim 13 wherein said means for displaying said content graphical user interface further includes a means for displaying a selection that identifies topic link data in said file object.

22. The graphical user interface system of claim 13 wherein said means for displaying said content graphical user interface further includes a means for displaying a graphical user interface that enables said end-user to format menu topic data.

23. The graphical user interface system of claim 13 wherein said means for displaying said content graphical user interface further includes a means for displaying a graphic user interface that enables said end-user to set a condition on the selection of external menu data in said object file.

24. The graphical user interface system of claim 13 wherein said means for displaying said content graphical user interface further includes a means for displaying a selection of menu topic data and topic link data from two different file objects.

* * * * *